No. 611,551. Patented Sept. 27, 1898.
G. C. AVERY.
CULTIVATOR.
(Application filed Aug. 4, 1898.)
(No Model.)
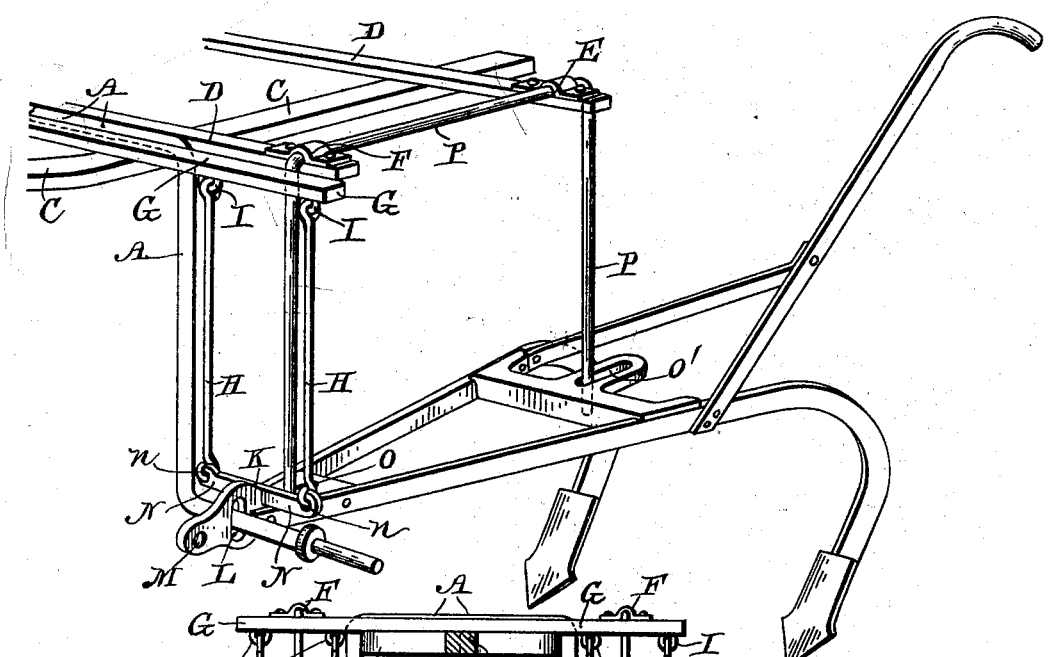
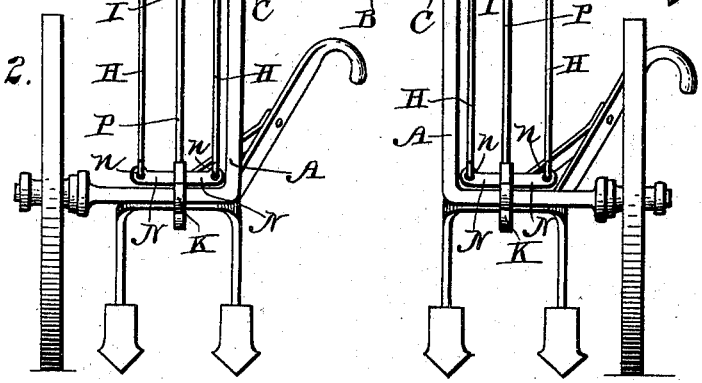
WITNESSES
Severance.
J Stewart Rice.
INVENTOR
George C Avery

UNITED STATES PATENT OFFICE.

GEORGE C. AVERY, OF LOUISVILLE, KENTUCKY, ASSIGNOR TO B. F. AVERY & SONS, OF SAME PLACE.

CULTIVATOR.

SPECIFICATION forming part of Letters Patent No. 611,551, dated September 27, 1898.

Application filed August 4, 1898. Serial No. 687,739. (No model.)

*To all whom it may concern:*

Be it known that I, GEORGE C. AVERY, a citizen of the United States, residing at Louisville, in the county of Jefferson and State of Kentucky, have invented certain new and useful Improvements in Cultivators; and I do hereby declare the following to be a full, clear, and exact description of the invention, such as will enable others skilled in the art to which it appertains to make and use the same.

My invention relates to wheeled cultivators, and has for its object to improve that class of cultivators in which provision is made for shifting the line of draft of either plow by simply moving the plow-handle either to the right or left, thereby causing the line of draft to always coincide with the line of motion, thus making the plow easy to hold and also keeping the shovels in the same position at right angles to the line of motion without regard to the distance between the two parallel plows, which are independently adjustable toward and from each other to vary the line of draft for either plow or both plows, as may be required.

My invention consists in providing improved means whereby the above objects can be most successfully and readily carried out, the improvements relating particularly to the means for suspending the forward ends of the plow-beams and holding them vertical and for shifting the line of draft, causing both ends of the plow-beam to move simultaneously and in substantial parallelism whenever either one of the plow-handles is shifted to the right or left, toward or from the opposite and parallel plow.

In the accompanying drawings, illustrating my invention, Figure 1 is a perspective of a portion of one side of a wheeled cultivator embodying my improvement. Fig. 2 is a front elevation of the same, showing the tongue in cross-section; and Fig. 3 is a top plan view of a portion of the cultivator-frame.

Referring to the drawings, A represents an arched axle, and B a tongue or pole the rear portion of which is preferably bifurcated and secured to the upper horizontal part of the axle-arch. The bifurcation or yoke portion of the tongue B is extended rearwardly beyond the point of attachment to the axle-arch, so as to provide two parallel and rearwardly-projecting horizontal extensions C of suitable length. Cross-bars D are secured to these extensions or bars C near their front and rear ends and are extended laterally beyond the same. At or near each end of the cross-bars D eyes or loops E and F, forming bearings, are provided. A cross-bar G is secured to the tongue B, preferably at points in front of and near to the axle-arch. The ends of this front cross-bar G project laterally to a further extent than the laterally-projecting ends of the cross-bars D and afford attachment for laterally and forwardly swinging suspension-rods H, the upper ends of which are hooked and pivotally engaged with the eyes I on the under side of the cross-bar G at each side of the eyes or loops F, which are provided near each end of the said front cross-bar D.

The forward end of the plow-beam is provided with a casting K. This casting is provided with a vertical slot L, through which the axle portion of the arch loosely passes. The casting is also provided in its forward end with an aperture M for the attachment of the team. The casting is also provided with laterally-extending arms N N, formed with an eye *n* in each end, to which the lower ends of the suspension-rods H H are attached. Slots O O' are provided on the cultivator-frame, as clearly shown in Fig. 3, for a purpose as will now be described. The slot O is preferably formed in the casting K. A longitudinally-arranged bail P is journaled in the front and rear loops or eyes E and F at each side of the cultivator-frame, the depending arms of which are passed through the slots O O' in the plow-beam at the front and rear, the arms of the bail being made of sufficient length to allow the plow to be moved up and down on the same without becoming separated therefrom. By this construction and arrangement it will be observed that by lifting the handle of either plow and moving either to the right or left a corresponding shifting of the line of draft will be instantly accomplished without affecting or changing the proper position of the shovels, which is parallel to the line of motion, and that the line of draft will always coincide with the line of motion of the shovels, so that the operator can readily guide the plows and avoid stumps and crooked hills, as in cultivating corn or other plants. It will also be observed that with my construction when the handles of the plows are shifted the bails do not move vertically and that the plow-beams move or rise up and down on the bails, a much more desirable construction than where the bails move up and down, as in such later construction guides have to be provided for the bails to move in, which makes the cultivator appear cumbersome, and the moving of the bails up and down is also awkward and objectionable; also, that the machine is rendered lighter and neater in appearance and easier to manipulate and the expense in construction is reduced. It will also be observed that by passing the axle portion loosely through the vertical slots L the draft will come directly on the gang and is not transmitted through rollers or other means, as in other constructions. By the use of the swinging vertical pendent rods or links H the front ends of the plow-beams are always kept vertical. By the use of the bails P, I am enabled to shift the line of draft and cause both ends of the bail to move simultaneously and in substantial parallelism whenever a plow-handle is shifted either to the right or left, toward or from the opposite parallel plow.

Having now described my invention, what I claim as new, and desire to secure by Letters Patent, is—

1. In a cultivator, the combination of two independent plow-beams carrying shovels, a frame, vertical suspension-rods connecting the forward ends of the plow-beams with the said frame, the plow-beams being provided with longitudinal slots, and with a vertical slot through which the axle portion of the frame loosely passes, and laterally-swinging bails pivotally connected at their upper ends to the frame of the cultivator, and having their lower ends extended through the longitudinal slots on the plow-beam, the construction and arrangement being such that when either of the plow-beams is shifted, the said plow-beam moves up and down on the bail, and the bails have no vertical movement, substantially as described.

2. In a wheel-cultivator, the combination of two independent plow-beams carrying shovels, and provided with longitudinal slots, an arched axle, a frame mounted on the axle-arch, a casting at the forward end of each plow-beam, each casting being provided with a vertical slot through which the axle portion of the arch loosely passes, the said casting being also provided with laterally-extending arms and with a longitudinal slot, vertical suspension-rods arranged to swing transversely, and connected at their upper ends to the frame and at their lower ends to the arms of the casting, and bails pivoted at their upper ends to the frame and having their lower ends extended through the slots on the plow-beam, the construction and arrangement being such that when the line of draft is shifted both ends of the plow-beam will move simultaneously and in substantial parallelism, and during such shifting the plow-beam will move up and down on the bails, and the draft is always directly on the gang, substantially as described.

In testimony whereof I hereunto affix my signature in presence of two witnesses.

GEORGE C. AVERY.

Witnesses:
L. C. BRADLEY,
W. S. AVERY.